United States Patent
Shimizu et al.

(10) Patent No.: US 11,320,840 B2
(45) Date of Patent: May 3, 2022

(54) ROTORCRAFT AND METHOD OF CONTROLLING ROTORCRAFT

(71) Applicant: SUBARU CORPORATION, Tokyo (JP)

(72) Inventors: Eisuke Shimizu, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 222 days.

(21) Appl. No.: 16/716,996

(22) Filed: Dec. 17, 2019

(65) Prior Publication Data

US 2020/0278699 A1 Sep. 3, 2020

(30) Foreign Application Priority Data

Mar. 1, 2019 (JP) .............................. JP2019-38075

(51) Int. Cl.
*G05D 1/08* (2006.01)
*B64C 27/32* (2006.01)
*G01L 1/22* (2006.01)

(52) U.S. Cl.
CPC .......... *G05D 1/0816* (2013.01); *B64C 27/32* (2013.01); *G05D 1/0858* (2013.01); *G01L 1/22* (2013.01)

(58) Field of Classification Search
CPC .. G05D 1/0816; G05D 1/0858; G05D 1/0669; G05D 1/0088; G05D 1/0204; G05D 1/042; G05D 1/046; G05D 1/0623; G05D 1/0653; G05D 1/102; B64C 27/32; B64C 2025/008; B64C 25/32; B64C 2025/325; B64C 2201/18; B64C 2201/14; B64C 25/10; B64C 2025/125; B64C 25/20; B64C 1/22; B64C 11/308; B64C 13/16; B64C 13/18; B64C 27/57; B64C 25/44;
(Continued)

(56) References Cited

U.S. PATENT DOCUMENTS

| 4,850,552 A | 7/1989 | Darden et al. |
| 10,514,690 B1 * | 12/2019 | Siegel ................... G01C 23/00 |

(Continued)

FOREIGN PATENT DOCUMENTS

| JP | 11-310199 A | 11/1999 |
| JP | 2006-051841 A | 2/2006 |
| JP | 2017-159873 A | 9/2017 |

OTHER PUBLICATIONS

Hernandez, "Carbon Fiber Reinforced Polymer and Epoxy Adhesive Tensile Test Failure Analysis Using Scanning Electron Microscopy", 2017, Materials Research (Year: 2017).*

(Continued)

*Primary Examiner* — Abby Y Lin
*Assistant Examiner* — Esvinder Singh
(74) *Attorney, Agent, or Firm* — McDermott Will & Emery LLP

(57) ABSTRACT

According to one implementation, a rotorcraft includes rotors, a fuselage, at least three rods, at least one load sensor and a control device. The rotors obtain lift. The fuselage is coupled to the rotors. The at least three rods support the fuselage. The at least one load sensor detects loads applied on the at least three rods. The control device automatically controls the rotors so that measured values of the loads detected by the at least one load sensor are brought to targeted values of the loads.

20 Claims, 4 Drawing Sheets

(58) Field of Classification Search
CPC ....... G01L 1/22; G01L 1/2206; G01L 1/2218;
G01L 1/2231; G01L 1/2268; G01L
5/1627; G01L 5/162
See application file for complete search history.

(56) References Cited

U.S. PATENT DOCUMENTS

| | | | |
|---|---|---|---|
| 2016/0244187 A1* | 8/2016 | Byers | B64D 1/00 |
| 2016/0272308 A1* | 9/2016 | Gentry | B64C 39/024 |
| 2016/0327958 A1* | 11/2016 | Vallart | B64C 27/04 |
| 2016/0349759 A1 | 12/2016 | Shue | |
| 2017/0274988 A1* | 9/2017 | Nguyen | B64C 25/28 |
| 2019/0049953 A1* | 2/2019 | Dong | G05D 1/0055 |
| 2019/0291859 A1* | 9/2019 | Manning | B64C 39/024 |
| 2020/0070960 A1* | 3/2020 | Parker | B64D 45/00 |
| 2020/0109944 A1* | 4/2020 | Zhang | G08G 5/0069 |
| 2020/0122822 A1* | 4/2020 | Bosworth | B64C 39/024 |
| 2020/0189722 A1* | 6/2020 | Duffy | B64C 11/008 |
| 2020/0272173 A1* | 8/2020 | Neubert | B64C 27/00 |
| 2020/0278700 A1* | 9/2020 | Lin | G05D 1/0816 |

OTHER PUBLICATIONS

European Office Action issued in corresponding European Patent Application No. 19219919.8-1010, dated Jun. 22, 2021.

Sheng S et al., "Autonomous takeoff and landing control for a prototype unmanned helicopter", Control Engineering Practice, Pergamon Press, vol. 18, No. 9, Sep. 30, 2010, pp. 1053-1059.

Shimada A et al., "Takeoff and Landing Control using Force Sensor by Electrically-Powered Helicopters", Advanced Motion Control, 2006. 9th IEEE International Workshop on Mar. 2006, IEEE, Mar. 29, 2006, pp. 62-65.

Masanori Fujita et al., "Takeoff and landing control using force sensor by electrically-powered helicopters", Denki Gakkai Ronbunshi. D, Sangyo Oyo Bumonshi Transactions of the Institute of Electrical Engineers of Japan. D, A Publication of Industray Applications Society, vol. 127, No. 2, Dec. 31, 2007, pp. 112-117.

Extended European Search Report issued in corresponding European Patent Application No. 19 219 919.8, dated Jul. 23, 2020.

* cited by examiner

ROTORCRAFT AND METHOD OF CONTROLLING ROTORCRAFT

CROSS REFERENCES TO RELATED APPLICATIONS

This application is based upon and claims the benefit of priority from Japanese Patent Application No. 2019-38075, filed on Mar. 1, 2019; the entire contents of which are incorporated herein by reference.

FIELD

Implementations described herein relate generally to a rotorcraft and a method of controlling a rotorcraft.

BACKGROUND

Conventionally, a rotorcraft having a plurality of rotors is known. In particular, a rotorcraft having not less than three rotors is also called a multi-copter. Conventionally, attitude control of a rotorcraft mounting rotors is performed by detecting the attitude of the rotorcraft using a gyroscope sensor or the like (for example, refer to Japanese Patent Application Publication JP2006-051841 A). Moreover, in order to stabilize a flight of a multi-copter or the like which carries freight, a technique of calculating and displaying a barycentric position by load sensors has also been proposed (for example, refer to Japanese Patent Application Publication JP2017-159873 and Japanese Patent Application Publication JPH11-310199).

However, in the method of controlling an attitude by detecting the attitude by a gyroscope sensor or the like, control command signals for changing thrust are output to rotors after the attitude changed. Therefore, control directions and responses of an attitude are delayed, which causes instability of the attitude at the time of a takeoff of a rotorcraft. When an attitude of a rotorcraft becomes unstable, the risk of falling increases.

Accordingly, an object of the present invention is to improve the safety at the time of a takeoff of a rotorcraft having rotors.

SUMMARY OF THE INVENTION

In general, according to one implementation, a rotorcraft includes rotors, a fuselage, at least three rods, at least one load sensor and a control device. The rotors obtain lift. The fuselage is coupled to the rotors. The at least three rods support the fuselage. The at least one load sensor detects loads applied on the at least three rods. The control device automatically controls the rotors so that measured values of the loads detected by the at least one load sensor are brought to targeted values of the loads.

Further, according to one implementation, a method of controlling a rotorcraft, having rotors for obtaining lift, a fuselage coupled to the rotors, and at least three rods that support the fuselage, includes: detecting loads applied on the at least three rods; and automatically controlling the rotors so that measured values of the detected loads are brought to targeted values of the loads.

DETAILED DESCRIPTION

A rotorcraft and a method of controlling a rotorcraft according to implementations of the present invention will be described with reference to the accompanying drawings.

(First Implementation)
(Structure and Function of Rotorcraft)

Figure 1:
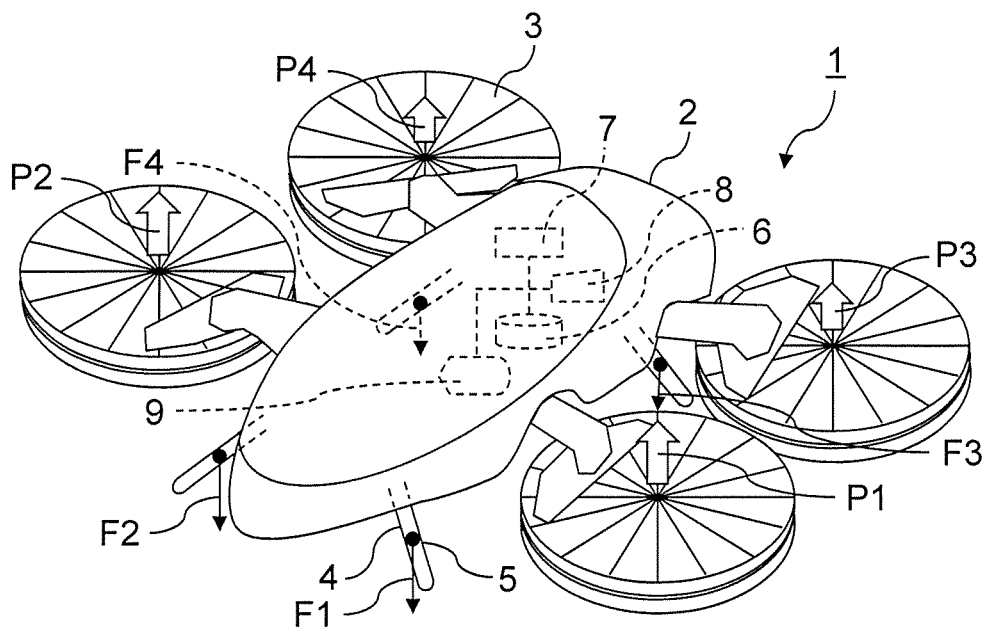
FIG. 1 is a perspective view showing structure of a rotorcraft according to the first implementation of the present invention.

FIG. 1 is a perspective view showing structure of a rotorcraft according to the first implementation of the present invention.

A rotorcraft 1 is composed of a fuselage 2, rotors 3 and rods 4. The rotors 3 and the rods 4 are attached to the fuselage 2. The rotorcraft 1 having not less than three rotors 3 is called a multicopter. As a matter of course, the rotorcraft 1 may be a helicopter which has two rotors 3.

The rotorcraft 1 may be not only a UAV (Unmanned aerial vehicle) on which people do not board but also an OPV (Optionally Piloted Vehicle) on which people board. An OPV is an unmanned aerial vehicle which a pilot can also board and drive, i.e., a hybrid aircraft of a manned aircraft and an unmanned aircraft. A UAV is also called a drone and typical UAVs include an unmanned multicopter and helicopter.

The rotors 3 are rotary wings for obtaining lifts at different positions. Each rotor 3 may has a tilt function so that thrust can be obtained by tilting each rotor 3 after a takeoff of the rotorcraft 1. In addition, a rotor having a purpose other than the purpose of obtaining a lift, such as a tail rotor, may be coupled to the fuselage 2 besides the rotors 3 for obtaining lifts.

The rods 4 are landing gears, which support the fuselage 2, by respectively contacting their tips to a surface on which the rotorcraft 1 lands while the rotorcraft 1 has landed. That is, the rotorcraft 1 does not necessarily have wheels and can land with the tips of the rods 4 as exemplified in FIG. 1. As a matter of course, wheels may be attached to the tips of the rods 4 for landing with the wheels, regardless of an example shown in FIG. 1. Henceforth, an example of a case where the rotorcraft 1 lands with the tips of the rods 4 as exemplified in FIG. 1 will be mainly described. It is necessary to couple at least three rods 4 to the fuselage 2 in order to land on the ground or the like, and support the fuselage 2. In the illustrated example, four rods 4 have been attached to the lower part of the fuselage 2.

A load sensor 5 is attached to each rod 4. Therefore, a load F1, a load F2, a load F3 and a load F4 applied on the respective rods 4 due to the weight of the rotorcraft 1 except the rods 4 their selves can be detected by the load sensors 5 respectively before a takeoff of the rotorcraft 1. Each load sensor 5 can be composed of at least one known sensor, such as a strain gauge or a piezo element. Therefore, an attachment position of the load sensor 5 to each rod 4 is determined to an appropriate position, such as a middle portion or a root portion of each rod 4, according to a shape of each rod 4 and a kind of the load sensor 5.

Figure 2:
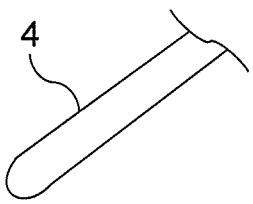
FIG. 2 shows the first example of a shape of the rod shown in FIG. 1.

FIG. 2 shows the first example of a shape of the rod 4 shown in FIG. 1.

As exemplified in FIG. 2, the rods 4, each having a linear shape without curvature, can be attached to the fuselage 2 so as to open outward. When a shape of each rod 4 is linear, design and production of each rod 4 become easy. A material of each rod 4 is flexible and may be a metal or a composite material as long as the metal has the strength which can support a load of the rotorcraft 1. When a metal is used as a material of each rod 4, for example, material cost can be reduced. Meanwhile, when a composite material is used as a material of each rod 4, weight saving can be attained with keeping high strength.

A composite material is also called an FRP (Fiber reinforced plastic), and a GFRP (Glass fiber reinforced plastic) and a CFRP (Carbon fiber reinforced plastics) are typical.

Figure 3:
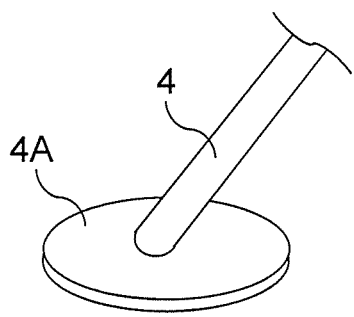
FIG. 3 shows the second example of a shape of the rod shown in FIG. 1.

FIG. 3 shows the second example of a shape of the rod 4 shown in FIG. 1.

As exemplified in FIG. 3, a disk member 4A may be attached to the tip of each rod 4. When the disk member 4A is attached to the tip of each rod 4, the rotorcraft 1 becomes possible to land on a place of which surface is not rigid, such as a place on the water, a marshes, a liquefied land or a place covered with plant.

Figure 4:
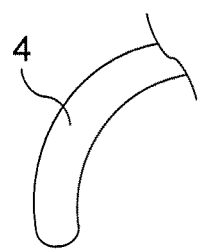
FIG. 4 shows the third example of a shape of the rod shown in FIG. 1.

FIG. 4 shows the third example of a shape of the rod 4 shown in FIG. 1.

As exemplified in FIG. 4, the rods 4, each having a curved shape, may be attached to the fuselage 2. As a matter of course, the disk member 4A exemplified in FIG. 3 may also be attached to the tip of each rod 4 having a curved shape. In particular, when each rod 4 having a curved shape is made of an FRP, it becomes easy to give desirable anisotropy to the mechanical characteristic.

Figure 5:
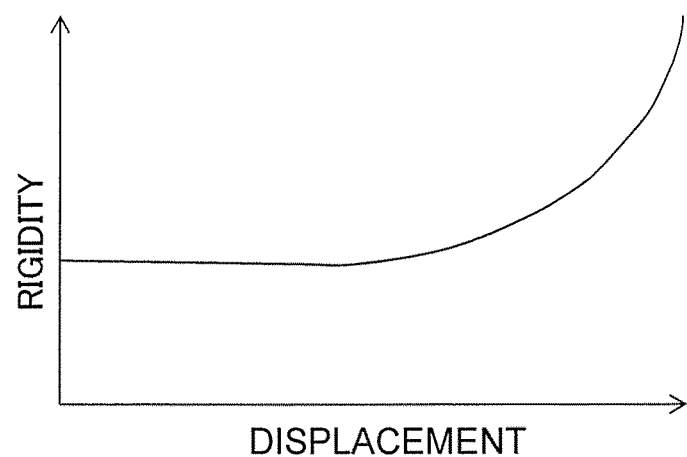
FIG. 5 is a graph explaining an example of a mechanical property given to the rod shown in FIG. 1.

FIG. 5 is a graph explaining an example of a mechanical property given to the rod 4 shown in FIG. 1.

In FIG. 5, the horizontal axis shows displacement of the rod 4 while the vertical axis shows rigidity of the rod 4. As exemplified in FIG. 5, a nonlinear mechanical characteristic that the rigidity of the rod 4 increases more as the displacement amount caused by bending deformation becomes larger can be given to the rod 4. Then, the bending amount of the rod 4 can be made large immediately after landing of the rotorcraft 1 while the bending amount of the rod 4 can be made small gradually. Thereby, the shock at the time of landing of the rotorcraft 1 can be softened. Such a mechanical property can also be given to the rod 4 having a linear shape exemplified in FIG. 2 to a certain extent.

In addition, when the rods 4 as exemplified in FIG. 2 or FIG. 4 are attached to the fuselage 2 so that the length directions may not become the same direction, the shock to each rod 4 at the time of landing of the rotorcraft 1 can be eased and failure of the load sensors 5 can be prevented, regardless of whether the mechanical property exemplified by FIG. 5 is given to each rod 4 or not.

In particular, when the rods 4 are attached to the fuselage 2 so that the length directions may not become parallel to the landing direction, each rod 4 can be bent in a case where the load F1, the load F2, the load F3 and the load F4 are applied on the rods 4 respectively. Thereby, the load F1, the load F2, the load F3 and the load F4 can be detected by measuring bending amounts of the rods 4 with strain gauges. Specifically, each load sensor 5 can be composed of strain gauges or the like which detect forces and moments in three axis directions orthogonal to each other so that the bending amounts of the respective rods 4 can be measured. Thereby, the load F1, the load F2, the load F3 and the load F4 applied on the rods 4 respectively can be calculated by known load calculations.

The fuselage 2 or the like of the rotorcraft 1 houses a control device 6 of the rotorcraft 1, a storage 7 for storing information necessary for controlling the rotorcraft 1 and the like, an input device 8 for inputting information necessary for controlling the rotorcraft 1 and the like into the control device 6, the storage 7, or the like, and a display 9 for displaying information necessary for a flight including a taking off and landing of the rotorcraft 1. Note that, the input device 8 and the display 9 may be placed outside the fuselage 2 or the like so that the rotorcraft 1 can be remotely operated.

The control device 6, the storage 7 and the input device 8 can be composed of electric circuits. The control device 6 can be built by reading a control program of the rotorcraft 1 into electronic circuitry, such as a computer.

The control device 6 can control targets to be controlled, including the respective rotation numbers and the respective pitch angles of the rotors 3. A pitch angle is an attachment angle of blades which composes each rotor 3, and a lift by the rotor 3 can be adjusted by changing the pitch angle of the rotor 3.

In particular, the control device 6 has a function to automatically control the rotors 3 based on the load F1, the load F2, the load F3 and the load F4 applied on the rods 4 respectively, detected by the load sensors 5, at the time of a takeoff of the rotorcraft 1 so that the fuselage 2 of the rotorcraft 1 may be stabilized. The fuselage 2 of the rotorcraft 1 is stabilized when the load F1, the load F2, the load F3 and the load F4 applied on the rods 4 respectively are the balanced ideal loads.

When any force acting on the rotorcraft 1 other than the gravity is negligible, the ideal load F1, load F2, load F3 and load F4, corresponding to the weight of the rotorcraft 1, which have been defined at the time of designing the rotorcraft 1, are applied on the rods 4 respectively. Therefore, the attitude of the rotorcraft 1 is stabilized. Meanwhile, when a force other than the gravity acting on the body of the rotorcraft 1 acts on the rotorcraft 1 by a disturbance, such as a wind or a cargo with large weight, the load F1, the load F2, the load F3 and the load F4 applied on the rods 4 respectively are changed. When the rotorcraft 1 takes off in an imbalanced state where the load F1, the load F2, the load F3 and the load F4 applied on the rods 4 respectively have been changed, the attitude of the rotorcraft 1 becomes unstable. When the attitude of the rotorcraft 1 becomes unstable, the risk of fall increases.

Thus, the control device 6 has a function to set targeted values of the load F1, the load F2, the load F3 and the load F4, applied on the rods 4 respectively before a takeoff of the rotorcraft 1, to desirable values which can balance the weight, and a function to control the rotation number and the pitch angle of each rotor 3 so that a state where the rotorcraft 1 does not take off while the load F1, the load F2, the load F3 and the load F4 are applied on the rods 4 respectively is made. Thereby, the load F1, the load F2, the load F3 and the load F4 applied on the rods 4 respectively in a state where the attitude of the rotorcraft 1 does not change before a takeoff of the rotorcraft 1 can be detected by the load sensors 5 respectively. Then, the control device 6 is configured so as to automatically control outputs P1, P2, P3 and P4 of the rotors 3 so that measured values of the load F1, the load F2, the load F3 and the load F4 applied on the rods 4, detected by the load sensors 5 respectively, before the takeoff may become targeted values.

The lifts obtained as the output P1, the output P2, the output P3 and the output P4 of the rotors 3 can be variably controlled by parameterizing the rotation numbers and the pitch angles of the rotors 3. Therefore, the control device 6 can automatically control the output P1, the output P2, the output P3 and the output P4 of the rotors 3 by automatically setting up controlling values of at least one of the rotation numbers and the pitch angles of the rotors 3.

Since a disturbance, such as a wind, may temporally change, the output P1, the output P2, the output P3 and the output P4 of the rotors 3, which should be obtained in order to bring the measured values of the load F1, the load F2, the load F3 and the load F4, applied on the rods 4 respectively, close to targeted values, may also temporally change. Therefore, the control device 6 can perform feedback control which changes at least one of the rotation numbers and the pitch angles of the rotors 3 so that the measured values of the load F1, the load F2, the load F3 and the load F4 applied on the rods 4 may approximate targeted values.

As a specific example, feedback control which brings the measured values of the load F1, the load F2, the load F3 and the load F4, applied on the rods 4, close to targeted values can be performed by changing at least one of the rotation number and the pitch angle of each rotor 3 by a predetermined constant increase and decrease amount. When a change amount of at least one of the rotation number and the pitch angle of each rotor 3 can be set to an appropriate amount based on the measured values of the load F1, the load F2, the load F3 and the load F4 applied on the rods 4, a control response speed can be improved.

Accordingly, information, such as tables or functions, directly or indirectly expressing a relation between sets of the measured values of the load F1, the load F2, the load F3 and the load F4 applied on the rods 4 respectively before a takeoff, and sets of control values of at least one of the rotation numbers and the pitch angles of the rotors 3 for bringing the measured values of the load F1, the load F2, the load F3 and the load F4 close to targeted values can be obtained beforehand by examinations or simulations. Then, the obtained information, such as tables or functions can be stored in the storage 7.

Thereby, the control device 6 becomes possible to automatically set up control values of at least one of the rotation numbers and the pitch angles of the rotors 3, corresponding to the measured values of the load F1, the load F2, the load F3 and the load F4 applied on the rods 4 respectively, with reference to the information stored in the storage 7. That is, it becomes possible to change control values of the rotation numbers and the pitch angles of the rotors 3 to appropriate control values according to the measured values of the load F1, the load F2, the load F3 and the load F4 applied on the rods 4 respectively, instead of gradually changing the control values of the rotation numbers and the pitch angles of the rotors 3.

Figure 6:
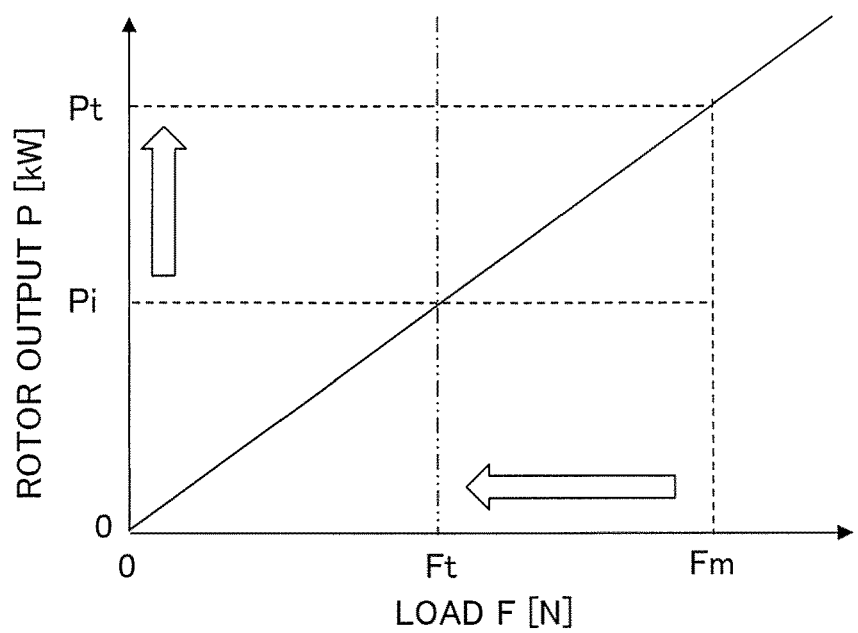
FIG. 6 is a graph showing an example of a function for automatically setting up the outputs of the respective rotors based on the loads respectively applied on the rods of the rotorcraft shown in FIG. 1.

FIG. 6 is a graph showing an example of a function for automatically setting up the outputs P1, P2, P3, and P4 of the respective rotors 3 based on the loads F1, F2, F3, and F4 respectively applied on the rods 4 of the rotorcraft 1 shown in FIG. 1.

In FIG. 6, the horizontal axis shows a load F applied on each rod 4 of the rotorcraft 1 while the vertical axis shows an output P from each rotor 3. For example, information showing a relation between measured values $F_m$ of a load F applied on a certain rod 4 and targeted values $P_t$ of an output P of the corresponding rotor 3, as exemplified in FIG. 6, can be stored in the storage 7 as a piece of information indirectly showing a relation between the loads F applied on the respective rods 4 before a takeoff and control values of at least one of the rotation numbers and the pitch angles of the rotors 3.

Specifically, even when the output P of each rotor 3 is set to an initial value $P_i$ so that the load F applied to the corresponding rod 4 before a takeoff may be a targeted value $F_t$, the measured value $F_m$ of the load F measured by the load sensor 5 does not necessarily coincide with the targeted value $F_t$ due to a disturbance, such as a wind. In such a case, the targeted value $P_t$ of the output P from each rotor 3 which should be re-set in order to bring the measured value $F_m$ of the load F close to the targeted value $F_t$ can be set with reference to the information, such as functions or tables. In the example shown in FIG. 6, information for obtaining the targeted value $P_t$ of the output P from a certain rotor 3, based on the measured value $F_m$ of the load F applied on the corresponding rod 4, is a linear function.

Although a function has been prepared so that the targeted value $P_t$ of the output P from a certain rotor 3 can be obtained based on the measured value $F_m$ of the load F applied on the corresponding one rod 4 in the example shown in FIG. 6, it may be appropriate or unavoidable to adjust the load F applied on one of the rods 4 or the loads F applied on the plurality of the rods 4 by changing the output P from one of the rotors 3 or the outputs P from the plurality of the rotors 3, like when the number of the rods 4 is different from the number of the rotors 3 or when positions of the rods 4 do not correspond to positions of the rotors 3. Accordingly, at least one value or a combination of measured values $F_m$ of the load F1, the load F2, the load F3 and the load F4 applied on at least one of the rods 4 before a takeoff may be related to at least one value or a combination of targeted values $P_t$ of the output P1, the output P2, the output P3 and the output P4 from at least one of the rotors 3, with at least one function or table.

When such a function as a database for converting the measured value $F_m$ or the measured values $F_m$ of the load F1, the load F2, the load F3 and the load F4, applied on at least one of the rods 4, into the targeted value $P_t$ or the targeted values $P_t$ of the output P1, the output P2, the output P3 and the output P4 of at least one of the rotors 3 is prepared in the storage 7, the control device 6 can specify a lift balance expressed by a combination of lifts which should be generated by the rotors 3, based on a load balance expressed by a combination of the measured values $F_m$ of the load F1, the load F2, the load F3 and the load F4 applied to the rods 4 and detected by the load sensors 5.

When the targeted values $P_t$ of the outputs P1, P2, P3 and P4 from the rotors 3 have been automatically set up in the control device 6, the control device 6 can automatically set up the control values of at least one of the rotation numbers and the pitch angles of the rotors 3, based on the targeted values $P_t$ of the outputs P1, P2, P3 and P4 of the rotors 3.

Note that, information directly showing a relation between sets of the measured values Fm of the load F1, the load F2, the load F3 and the load F4 applied on the rods 4 respectively before a takeoff and sets of the control values of at least one of the rotation numbers and the pitch angles of the rotors 3 may be prepared as functions or tables, and stored in the storage 7. That is, conversion information in which the vertical axis of FIG. 6 is replaced with control values of the rotation number or the pitch angle of the rotor 3 may be previously obtained by examinations, simulations or the like, and stored as reference information in the storage 7. In that case, the control value of the rotation number or the pitch angle of the rotor 3 can be specified directly by referring to the reference information stored in the storage 7.

As mentioned above, the force acting on each rod 4 by a disturbance may change temporally. Therefore, feedback control which dynamically repeats measurement of the measured values Fm of the load F1, the load F2, the load F3 and the load F4 applied on the rods 4 respectively, and an automatic setting of the control values of the rotation numbers or the pitch angles of the rotors 3, based on the reference information stored in the storage 7 may be performed. Conversely, when the force acting on each rod 4 by a disturbance does not change temporally, one correction to the control values of at least one of the rotation numbers and the pitch angles of the rotors 3, based on the reference information makes the load F1, the load F2, the load F3 and the load F4 applied on the rods 4 respectively become the targeted values Ft theoretically.

Then, after the load F1, the load F2, the load F3 and the load F4 applied on the rods 4 respectively have reached the targeted values Ft, the output P1, the output P2, the output P3 and the output P4 of the rotors 3 are increased under control by the control device 6 so that a lift necessary for a takeoff of the rotorcraft 1 can be generated. Thereby, the rotorcraft 1 can take off.

In addition to such automatic control of the rotors 3 for the stabilization at the time of a takeoff of the rotorcraft 1, the control device 6 can control to stop a takeoff of the rotorcraft 1 in a case where the body of the rotorcraft 1 excessively vibrates by a disturbance, such as a wind. The scale of a vibration which generated on the body including the fuselage 2 of the rotorcraft 1 can be detected based on time variations of the load F1, the load F2, the load F3 and the load F4 detected by the load sensors 5.

The vibration scale can be expressed by desired parameters, such as amplitudes and frequencies of time changes of the load F1, the load F2, the load F3 and the load F4 detected by the load sensors 5. Specifically, it can be determined that the vibration scale is large when temporal variation amounts or variation amounts per unit time of the load F1, the load F2, the load F3 and the load F4 applied on the rods 4 respectively are large. Therefore, it can be detected whether vibration is so excessive that a takeoff of the rotorcraft 1 should be stopped, by threshold processing of each parameter showing the vibration scale of the body including the fuselage 2, which determines whether each parameter showing the vibration scale of the body including the fuselage 2 is within an allowable range.

Accordingly, the control device 6 can be provided with a function to detect parameters showing the vibration scale of the fuselage 2, based on time changes of the measured values Fm of the load F1, the load F2, the load F3 and the load F4 detected by the load sensors 5 and to perform processing in order to stop a takeoff when it was automatically determined that at least one detected parameter was out of an allowable range.

Examples of processing in order to stop a takeoff of the rotorcraft 1 include control processing which automatically stops the takeoff of the rotorcraft 1 by automatically stop rotations of the rotors 3 under control by the control device 6. Alternatively, warning information to stop a takeoff may be indicated on the display 9 so that a pilot in the rotorcraft 1 or a manipulator who remotely controls the rotorcraft 1 can manually stop rotations of the rotors 3. Such information processing allows a judgment whether the rotorcraft 1 can take off safely, before a takeoff.

(Method of Controlling Rotorcraft)

Next, a method of controlling the rotorcraft 1 will be described.

Figure 7:
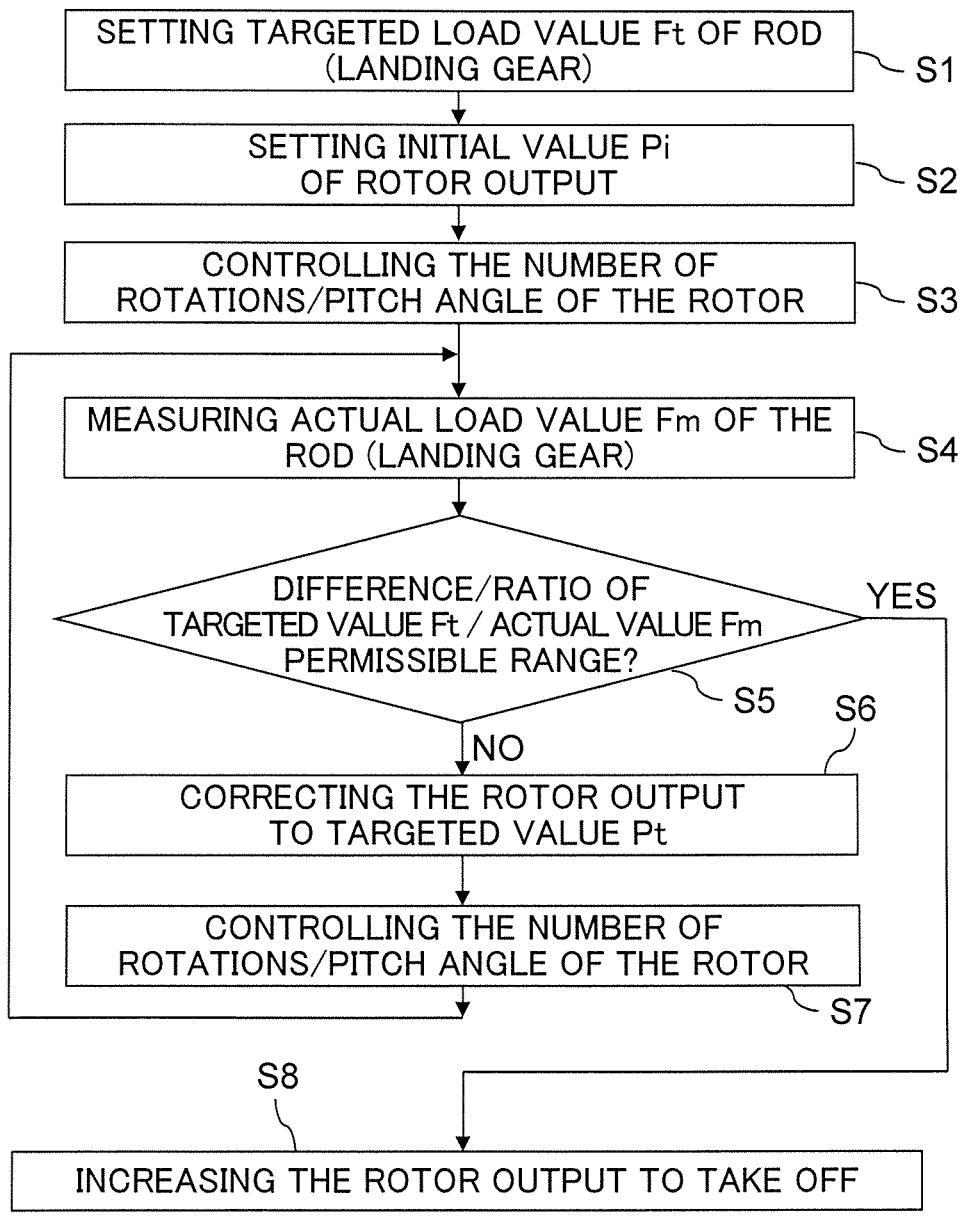
FIG. 7 is a flow chart showing a flow of control at the time of a takeoff of the rotorcraft shown in FIG. 1.

FIG. 7 is a flow chart showing a flow of control at the time of a takeoff of the rotorcraft 1 shown in FIG. 1.

Firstly, in step S1, the control device 6 sets the targeted values Ft of the load F1, the load F2, the load F3 and the load F4 applied on the rods 4 which function as a landing gear of the rotorcraft 1. The targeted values Ft of the load F1, the load F2, the load F3 and the load F4 applied on the rods 4 respectively may be set as fixed values in advance, or may be variably set by operation of the input device 8.

Next, in step S2, the values of the output P1, the output P2, the output P3 and the output P4 of the rotors 3, which should be set in order to make the load F1, the load F2, the load F3 and the load F4, applied on the rods 4 respectively, be the targeted values Ft, in a case where a force by a disturbance, such as a wind, does not act on the rotorcraft 1, are set to the initial values Pi by the control device 6.

Next, in step S3, the control device 6 automatically controls the rotation numbers and the pitch angles of the rotors 3 so that the output P1, the output P2, the output P3 and the output P4 of the rotors 3 may be the initial values P1. Then, a lift by which the rotorcraft 1 cannot take off is generated by rotating the rotors 3. Consequently, the load F1, the load F2, the load F3 and the load F4 applied on the rods 4 respectively decrease compared with those before starting the rotations of the rotors 3.

Next, in step S4, the measured values Fm of the load F1, the load F2, the load F3 and the load F4 applied on the rods 4 respectively are detected by the load sensors 5. The detected measured values Fm of the load F1, the load F2, the load F3 and the load F4 are output from the load sensors 5 to the control device 6.

Next, in step S5, the measured values Fm of the load F1, the load F2, the load F3 and the load F4 applied on the rods 4 respectively are compared with the targeted values Ft respectively in the control device 6. Thereby, respective deviation amounts of the measured values Fm from the targeted values Ft are obtained. For example, the differences or ratios between the targeted values Ft and the measured values Fm can be calculated as the deviation amounts of the measured values Fm respectively. Then, the control device 6 automatically determines whether the deviation amounts of the measured values Fm of the load F1, the load F2, the load F3 and the load F4 applied on the rods 4 respectively are each within an allowable range. As a concrete example, it is automatically determined by threshold processing whether the measured values Fm of the load F1, the load F2, the load F3 and the load F4 applied on the rods 4 respectively are each within an allowable range which is specified by an upper limit value and a lower limit value, such as ±10 [N], set experientially.

When at least one of the load F1, the load F2, the load F3 and the load F4 applied on the rods 4 respectively increases by a force, such as a wind force or the gravity acting on cargos, other than the gravity acting on the rotorcraft 1 itself, at least one of the measured values Fm of the load F1, the load F2, the load F3 and the load F4 applied on the rods 4 respectively may be out of an allowable range. For example, the measured value Fm of the load F applied on a certain rod 4 exceeds an allowable range and becomes excessive as exemplified in FIG. 6.

In such a case, the control value of the output P of at least one corresponding rotor 3 is corrected to the targeted value Pt, in step S6. The targeted value Pt of the output P of the at least one corresponding rotor 3 can be automatically set in the control device 6, based on the reference information expressed as a function or a table as exemplified in FIG. 6. Specifically, the control device 6 refers to the reference information, such as a linear function, stored in the storage 7 and automatically set the targeted values Pt of the output P1, the output P2, the output P3 and the output P4 of the rotors 3, corresponding to the measured values Fm of the load F1, the load F2, the load F3 and the load F4 applied on the rods 4 respectively.

Next, in step S7, the control device 6 automatically controls the rotation numbers and the pitch angles of the rotors so that the output P1, the output P2, the output P3 and the output P4 of the rotors 3 may be the targeted values Pt. Thereby, the measured values Fm of the load F1, the load F2, the load F3 and the load F4 applied on the rods 4 respectively can be brought close to the targeted values Ft. That is, the rotors 3 can be automatically controlled so that the body including the fuselage 2 can be stabilized.

After at least one of the rotation number and the pitch angle of at least one rotor 3 has been changed, the measurement of the measured values Fm of the load F1, the load F2, the load F3 and the load F4 in step S4 and the determination in step S5 are performed again. Then, the correction of the targeted value Pt or the targeted values Pt of the output P1, the output P2, the output P3 and/or the output P4 of a rotor 3 or rotors 3 in step S6 and the control of the rotation number and the pitch angle of each rotor 3 in step S7 are repeated until it is determined that all of the deviation amounts from the targeted values Ft, of the measured values Fm of the load F1, the load F2, the load F3 and the load F4 applied on the rods 4 are each within an allowable range in the determination in step S5.

That is, feedback control which resets the targeted values Pt of the output P1, the output P2, the output P3 and the output P4 of the rotors 3 in order to bring the measured values Fm of the load F1, the load F2, the load F3 and the load F4, applied on the rods 4 respectively, close to the targeted values Ft is performed. Thereby, even when the magnitude of a force by a disturbance, such as a wind, temporally changes, the measured values Fm of the load F1, the load F2, the load F3 and the load F4 applied on the rods 4 can be brought close to the targeted values Ft respectively.

When it has been determined that all of the deviation amounts from the targeted values Ft, of the measured values Fm of the load F1, the load F2, the load F3 and the load F4 applied on the rods 4 are each within an allowable range, in the determination in step S5, takeoff control of the rotorcraft 1 is performed in step S8. That is, the control device 6 increases the output P1, the output P2, the output P3 and the output P4 of the rotors 3. Thereby, the measured values Fm of the load F1, the load F2, the load F3 and the load F4 applied on the rods 4 decrease gradually, and the rotorcraft 1 takes off at the time when each of the measured values Fm of the load F1, the load F2, the load F3 and the load F4 becomes zero.

Note that, the vibration scale of the rotorcraft 1 may be detected based on time changes of the load F1, the load F2, the load F3 and the load F4 detected by the load sensors 5 in advance of the flow shown in FIG. 7, and a takeoff can be stopped when a vibration has become excessive.

(Effects)

As described above, in the rotorcraft 1 and the method of controlling the rotorcraft 1, the load sensors 5 attached to the rods 4 which are landing devices of the rotorcraft 1 measures the measured values Fm of the loads F, and the outputs P of the necessary rotors 3 out of the rotors 3 are corrected so that the rotorcraft 1 takes off after the load F applied to each rod 4 has become the targeted value Ft.

Therefore, according to the rotorcraft 1 and the method of controlling the rotorcraft 1, the instability of the body at the time of a takeoff can be suppressed. Thereby, stability and safety can be improved. Specifically, the attitude of the body of the rotorcraft 1 can be stabilized since the rotorcraft 1 can take off after uniforming the load F1, the load F2, the load F3 and the load F4 applied on the rods 4, composing a landing gear, just before a takeoff of the rotorcraft 1.

Moreover, when a vibration of the rotorcraft 1 is excessively large, a takeoff can be canceled and safety can also be secured.

(Second Implementation)

Figure 8:
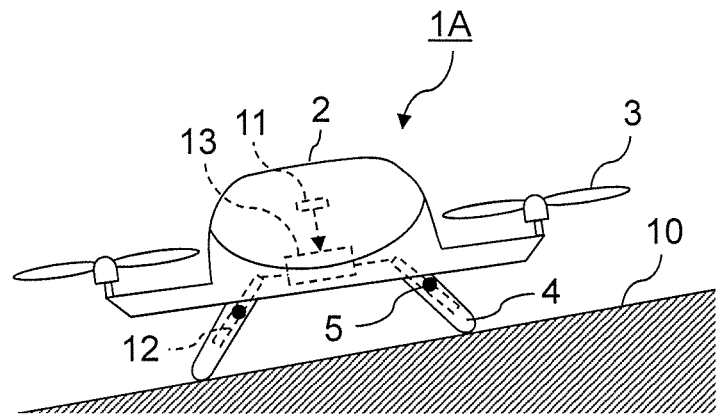
FIG. 8 is a front view showing structure of a rotorcraft according to the second implementation of the present invention.

FIG. 8 is a front view showing structure of a rotorcraft according to the second implementation of the present invention.

A rotorcraft 1A in the second implementation shown in FIG. 8 is different from the rotorcraft 1 in the first implementation in a structure by which the attitude of the body can be horizontal even when the rotorcraft 1A lands on a sloping surface 10. Other configurations and actions of the rotorcraft 1A in the second implementation are not substantially different from those of the rotorcraft 1 in the first implementation. Therefore, only a schematic front view of the rotorcraft 1A is shown, and the same signs are attached to the same elements or the corresponding elements while explanation thereof is omitted.

The rotorcraft 1A in the second implementation includes an angle sensor 11, expansion mechanisms 12 and a rod control device 13 in addition to elements similar to those in the first implementation. The angle sensor 11 detects an inclined angle of the body including the fuselage 2, relative to the horizontal direction. The expansion mechanisms 12 expand and contract the rods 4 respectively. The rod control device 13 expands and contracts the rods 4 by controlling the expansion mechanisms 12 respectively.

The angle sensor 11 can be disposed at a desired position as long as a spatial inclined angle of the body can be measured. Examples of the expansion mechanism 12 which expands and contracts the rod 4 include known mechanisms, such as a rack and pinion which is a kind of gears, a ball screw and a cylinder mechanism having a piston. The rod control device 13 can be composed of electronic circuitry, such as a computer, which has read a program, similarly to the control device 6 of the rotorcraft 1A. Accordingly, the rod control device 13 may be integrated with the control device 6 of the rotorcraft 1A.

When the rotorcraft 1A attempts to take off from the sloping surface 10 which slants to the horizontal direction as exemplified in FIG. 8, the attitude may become unstable since a lift generated by each rotor 3 is not in the vertical direction. Accordingly, the inclination of the rotorcraft 1A can be detected by the angle sensor 11, and the attitude of the rotorcraft 1A can be horizontal by expanding and contracting the necessary rods 4 by the expansion mechanisms 12 when the rotorcraft 1A is inclined.

More specifically, the inclined angle to the horizontal direction of the rotorcraft 1A detected by the angle sensor 11 can be output to the rod control device 13. Then, the rod control device 13 can determine whether the inclined angle of the rotorcraft 1A is within an allowable range, by threshold processing. When it has been determined that the inclined angle of the rotorcraft 1A was out of the allowable range, the rod control device 13 can control the expansion mechanisms 12 to expand and contract at least one of the rods 4 so that the inclined angle of the rotorcraft 1A detected by the angle sensor 11 may become within the allowable range.

Figure 9:
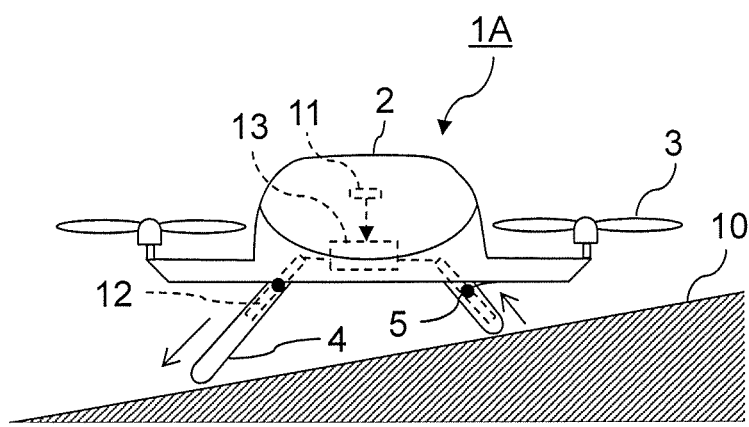
FIG. 9 is a front view showing a state where the attitude of the rotorcraft shown in FIG. 8 is horizontal.

FIG. 9 is a front view showing a state where the attitude of the rotorcraft 1A shown in FIG. 8 is horizontal.

As shown in FIG. 9, the rods 4 can be expanded and contracted according to an inclined angle of the sloping surface 10. Thereby, the body of the rotorcraft 1A can be made horizontal and a lift obtained by rotation of each rotor 3 can be directed in the vertical direction. As a result, it becomes possible to perform stabilization control at the time of a takeoff, including setting the targeted values Ft of the load F1, the load F2, the load F3 and the load F4 applied to the rods 4 and setting the targeted values Pt of the output P1, the output P2, the output P3 and the output P4 of the rotors 3, similarly to the first implementation.

That is, in the second implementation, after making the attitude of the rotorcraft 1A horizontal by expanding and contracting the necessary rods 4 corresponding to an inclined angle of the rotorcraft 1A detected by the angle sensor 11, stabilization control at the time of a takeoff of the rotorcraft 1A can be performed along the flow exemplified in FIG. 7. Note that, feedback control which expands and contracts the rods 4 based on an inclined angle of the rotorcraft 1A output from the angle sensor 11 so that the inclined angle of the rotorcraft 1A becomes zero may be performed.

By the way, when the rod 4 is expanded and contracted, the protruding length of the rod 4 or the length itself of the rod 4 is changed depending on a structure of the rod 4. When the protruding length of the rod 4 changes, the tip of the rod 4 may be bent and deformed with a different deformation amount even when the load F applied on the rod 4 is constant. In such a case, it becomes possible to detect the load F regardless of an expansion amount of the rod 4 by previously obtaining reference information, such as functions or tables, showing a relation between the loads F applied on the rod 4 and deformation amounts of the rod 4 for each expansion amount of the rod 4. That is, each load sensor 5 can be configured to detect the load F applied on the rod 4, based on an expansion amount and a deformation amount of the rod 4.

According to the above-mentioned second implementation, a stable takeoff can be realized by avoiding generation of a lift in a direction oblique to the vertical direction even when the rotorcraft 1A takes off from the sloping surface 10 oblique to the horizontal direction.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A rotorcraft comprising:
   rotors for obtaining lift;
   a fuselage coupled to the rotors;
   at least three rods that support the fuselage;
   at least one load sensor that detects loads applied on the at least three rods; and
   a control device having circuitry, the control device automatically controlling the rotors so that each of measured values of the loads detected by the at least one load sensor before the rotorcraft takes off and while the rotors are controlled to obtain first lift by which the rotorcraft cannot take off is within an allowable range of the loads, wherein the allowable range is specified by an upper limit value and a lower limit value.

2. The rotorcraft according to claim 1, further comprising:
   storage that stores information directly or indirectly expressing a relation between the loads applied on the at least three rods before a takeoff of the rotorcraft and control values of at least one of rotation numbers and pitch angles of the rotors,
   wherein the control device is adapted to automatically set the control values of the at least one of the rotation numbers and the pitch angles, with reference to the information stored by the storage.

3. The rotorcraft according to claim 2,
   wherein information expressing a relation between the measured values of the loads applied on the at least three rods before the takeoff and targeted values of outputs from the rotors is stored in the storage, as the information indirectly expressing the relation between the loads and the control values, and
   wherein the control device is adapted to automatically set the control values based on the targeted values of the outputs from the rotors.

4. The rotorcraft according to claim 3,
   wherein length directions of the at least three rods are not parallel to each other so that the at least three rods bend when the loads are applied on the at least three rods, and
   wherein the at least one load sensor detects the loads by measuring, with strain gauges, bending deformation amounts of the at least three rods.

5. The rotorcraft according to claim 2,
   wherein length directions of the at least three rods are not parallel to each other so that the at least three rods bend when the loads are applied on the at least three rods, and
   wherein the at least one load sensor detects the loads by measuring, with strain gauges, bending deformation amounts of the at least three rods.

6. The rotorcraft according to claim 1, wherein the control device is adapted to perform feedback control that changes at least one of rotation numbers and pitch angles of the rotors so that the measured values of the loads are brought close to the allowable range of the loads.

7. The rotorcraft according to claim 6,
   wherein length directions of the at least three rods are not parallel to each other so that the at least three rods bend when the loads are applied on the at least three rods, and
   wherein the at least one load sensor detects the loads by measuring, with strain gauges, bending deformation amounts of the at least three rods.

8. The rotorcraft according to claim 1, wherein the control device is adapted to detect a parameter, expressing a scale of vibration of the fuselage, based on changes over time of the loads detected by the at least one load sensor, and perform processing for stopping a takeoff of the rotorcraft when the control device has automatically determined that the detected parameter is out of a permissible range.

9. The rotorcraft according to claim 8,
wherein length directions of the at least three rods are not parallel to each other so that the at least three rods bend when the loads are applied on the at least three rods, and
wherein the at least one load sensor detects the loads by measuring, with strain gauges, bending deformation amounts of the at least three rods.

10. The rotorcraft according to claim 1, further comprising:
an angle sensor that detects an inclination angle of the fuselage to a horizontal direction;
expansion mechanism having at least one of a gear, a ball screw and a piston, the mechanism expanding and contracting the at least three rods; and
a rod control device having the circuitry or another circuitry, the rod control device expanding and contracting at least one of the at least three rods by controlling the expansion mechanism when the inclination angle detected by the angle sensor is out of a permissible angle range so that the inclination angle of the fuselage is made within the permissible angle range.

11. The rotorcraft according to claim 10, wherein the at least one load sensor detects the loads based on expansion and contraction amounts of the at least three rods, and deformation amounts of the at least three rods.

12. The rotorcraft according to claim 11,
wherein length directions of the at least three rods are not parallel to each other so that the at least three rods bend when the loads are applied on the at least three rods, and
wherein the at least one load sensor detects the loads by measuring, with strain gauges, bending deformation amounts of the at least three rods.

13. The rotorcraft according to claim 10,
wherein length directions of the at least three rods are not parallel to each other so that the at least three rods bend when the loads are applied on the at least three rods, and
wherein the at least one load sensor detects the loads by measuring, with strain gauges, bending deformation amounts of the at least three rods.

14. The rotorcraft according to claim 1,
wherein length directions of the at least three rods are not parallel to each other so that the at least three rods bend when the loads are applied on the at least three rods, and
wherein the at least one load sensor detects the loads by measuring, with strain gauges, bending deformation amounts of the at least three rods.

15. The rotorcraft according to claim 1, wherein the at least three rods are not curved, have linear shapes and are open outward.

16. The rotorcraft according to claim 1, wherein the at least three rods are curved and each made of a fiber reinforced plastic having a mechanical property that rigidity increases nonlinearly as a bending deformation amount becomes large.

17. The rotorcraft according to claim 1, wherein a disk member is attached to a tip of at least one of the at least three rods.

18. A method of controlling a rotorcraft including rotors for obtaining lift, a fuselage coupled to the rotors, and at least three rods that support the fuselage, the method comprising:
detecting loads applied on the at least three rods; and
automatically controlling the rotors so that each of measured values of the detected loads before the rotorcraft takes off and while the rotors are controlled to obtain first lift by which the rotorcraft cannot take off is within an allowable range of the loads, wherein the allowable range is specified by an upper limit value and a lower limit value.

19. The method of controlling the rotorcraft according to claim 18, further comprising:
storing information in storage, the information directly or indirectly expressing a relation between the loads applied on the at least three rods before a takeoff of the rotorcraft and control values of at least one of rotation numbers and pitch angles of the rotors,
wherein the control values of the at least one of the rotation numbers and the pitch angles are automatically set with reference to the information stored by the storage.

20. The method of controlling the rotorcraft according to claim 19,
wherein information expressing a relation between the measured values of the loads applied on the at least three rods before the takeoff and targeted values of outputs from the rotors is stored in the storage, as the information indirectly expressing the relation between the loads and the control values, and
wherein the control values are automatically set based on the targeted values of the outputs from the rotors.

* * * * *